(12) United States Patent
Cacciacarro

(10) Patent No.: US 9,038,672 B2
(45) Date of Patent: May 26, 2015

(54) HOLLOW ARTICLE OF VARIABLE WALL STRUCTURE DENSITY

(75) Inventor: Danny Cacciacarro, Mississauga, CA (US)

(73) Assignee: Salflex Polymers Limited, Weston, ON (CA)

( * ) Notice: Subject to any disclaimer, the term of this patent is extended or adjusted under 35 U.S.C. 154(b) by 0 days.

(21) Appl. No.: 13/990,776

(22) PCT Filed: Dec. 1, 2011

(86) PCT No.: PCT/CA2011/001313
§ 371 (c)(1),
(2), (4) Date: May 30, 2013

(87) PCT Pub. No.: WO2012/083422
PCT Pub. Date: Jun. 28, 2012

(65) Prior Publication Data
US 2013/0255820 A1 Oct. 3, 2013

Related U.S. Application Data

(60) Provisional application No. 61/419,142, filed on Dec. 2, 2010.

(51) Int. Cl.
*F16L 9/14* (2006.01)
*F16L 9/133* (2006.01)
*B29C 44/04* (2006.01)
(Continued)

(52) U.S. Cl.
CPC .............. *F16L 9/133* (2013.01); *B29C 44/04* (2013.01); *B29C 47/0042* (2013.01); *B29L 2023/003* (2013.01); *B29C 47/0033* (2013.01); *B29C 47/065* (2013.01); *B29K 2023/06* (2013.01); *B29K 2023/12* (2013.01); *B29K 2071/12* (2013.01); *B29K 2077/00* (2013.01); *B29K 2081/04* (2013.01); *B29C 49/0005* (2013.01); *B29C 49/04* (2013.01); *B29C 49/22* (2013.01); *B29B 2911/14326* (2013.01); *B29C 2049/609* (2013.01); *B29L 2023/004* (2013.01); *B29K 2105/04* (2013.01); *B29C 2049/222* (2013.01);
(Continued)

(58) Field of Classification Search
USPC .......................... 138/137, 140, 141; 428/36.5
See application file for complete search history.

(56) References Cited

U.S. PATENT DOCUMENTS 3,457,337 A 7/1969 Turner
3,550,639 A * 12/1970 Okuda .......................... 138/121
(Continued)

FOREIGN PATENT DOCUMENTS

CA 2011802 A1 9/1991
CA 2083523 A1 5/1994
(Continued)

OTHER PUBLICATIONS

International Search Report and Written Opinion, Int'l Application No. PCT/CA2011/001313, dated Mar. 7, 2012.

*Primary Examiner* — Patrick F Brinson
(74) *Attorney, Agent, or Firm* — Medler Ferro PLLC

(57) ABSTRACT

A molded thermoplastic article including a hollow body is provided, the article comprising a first layer, and a foamed second layer, the first layer and foamed second layer defining a wall structure, the foamed second layer having a lighter density relative to the first layer. In the wall structure, the ratio of the first layer to foamed second layer varies along the length of the article.

9 Claims, 7 Drawing Sheets

(51) Int. Cl.
  *B29C 49/00*  (2006.01)
  *B29C 49/04*  (2006.01)
  *B29C 49/22*  (2006.01)
  *B32B 27/06*  (2006.01)
  *B32B 3/26*   (2006.01)
  *B29C 47/00*  (2006.01)
  *B29L 23/00*  (2006.01)
  *B29C 47/06*  (2006.01)
  *B29K 23/00*  (2006.01)
  *B29K 71/00*  (2006.01)
  *B29K 77/00*  (2006.01)
  *B29K 81/00*  (2006.01)
  *B29C 49/60*  (2006.01)
  *B29K 105/04* (2006.01)

(52) U.S. Cl.
  CPC ............... *B32B 27/065* (2013.01); *B32B 3/263* (2013.01); *B32B 2597/00* (2013.01)

(56) References Cited

U.S. PATENT DOCUMENTS

| | | | | |
|---|---|---|---|---|
| 4,269,234 | A * | 5/1981 | Johnson et al. | 138/121 |
| 5,324,557 | A * | 6/1994 | Lupke | 428/36.5 |
| 5,662,842 | A | 9/1997 | Sadr et al. | |
| 5,975,143 | A * | 11/1999 | Jarvenkyla et al. | 138/121 |
| 6,968,888 | B2 * | 11/2005 | Kolowich | 165/10 |
| 8,795,802 | B2 * | 8/2014 | Onodera | 428/36.5 |
| 2007/0031622 | A1 | 2/2007 | Imanari et al. | |
| 2008/0258353 | A1 * | 10/2008 | Hutchinson et al. | 264/483 |
| 2011/0091673 | A1 * | 4/2011 | Luger et al. | 428/36.5 |

FOREIGN PATENT DOCUMENTS

| | | |
|---|---|---|
| CA | 2270327 A1 | 11/1999 |
| JP | 02-269033 A | 11/1990 |
| JP | 2010-240100 A | 10/2010 |

* cited by examiner

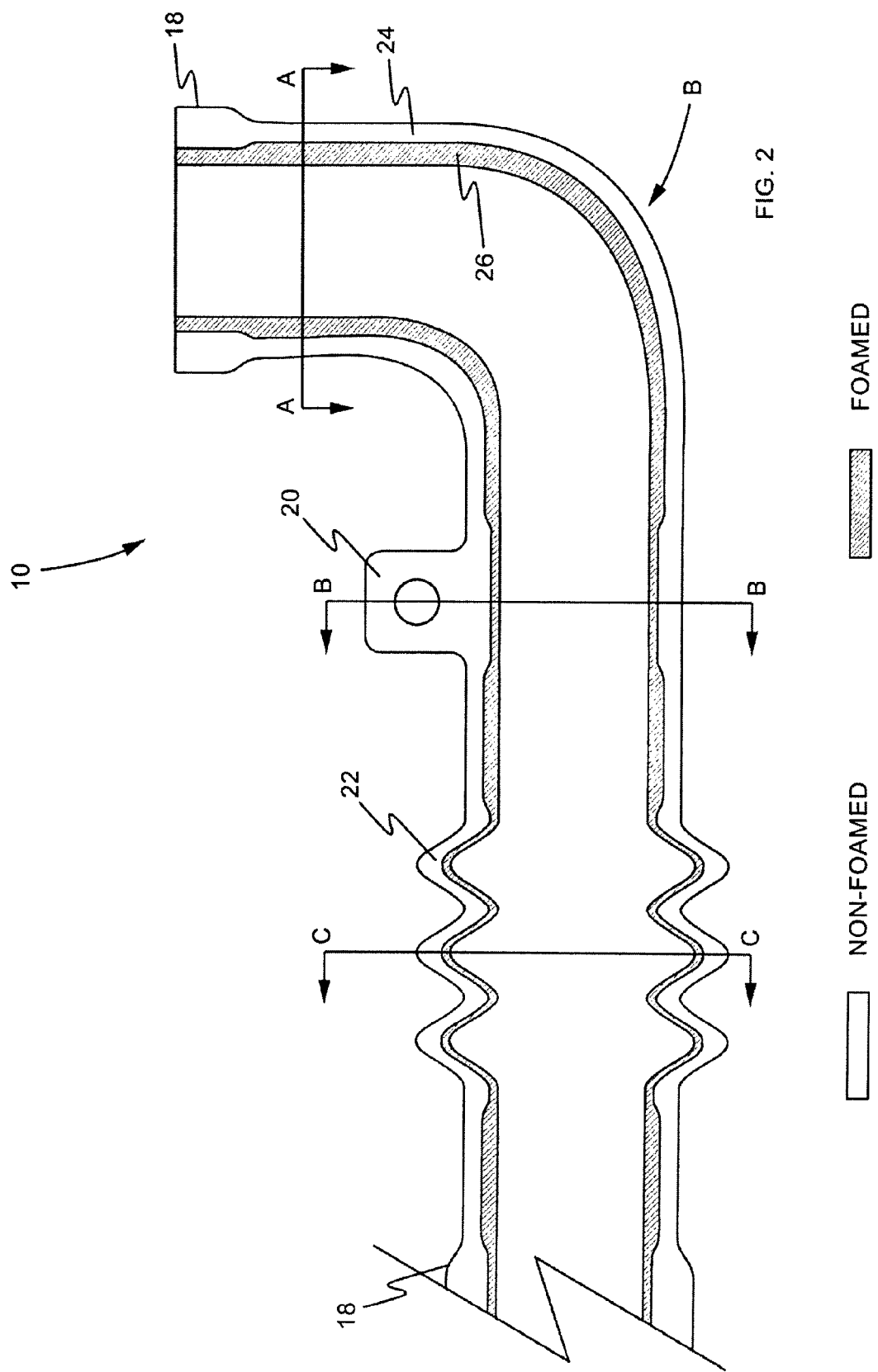

(A:A)

(B:B)

(C:C)

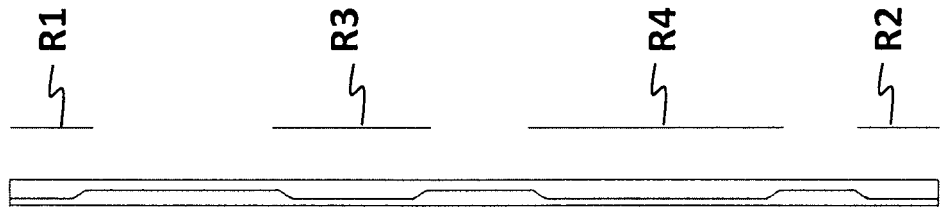
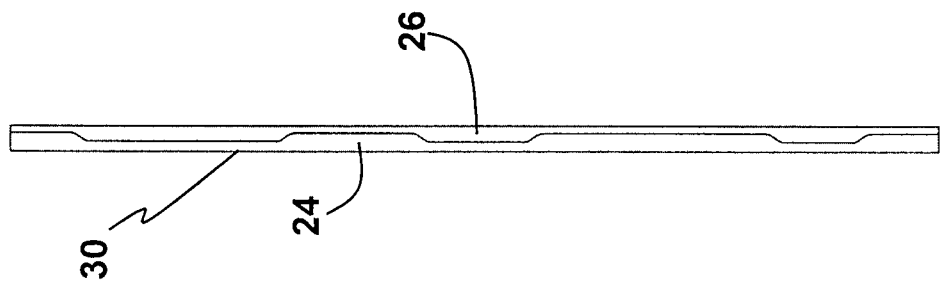
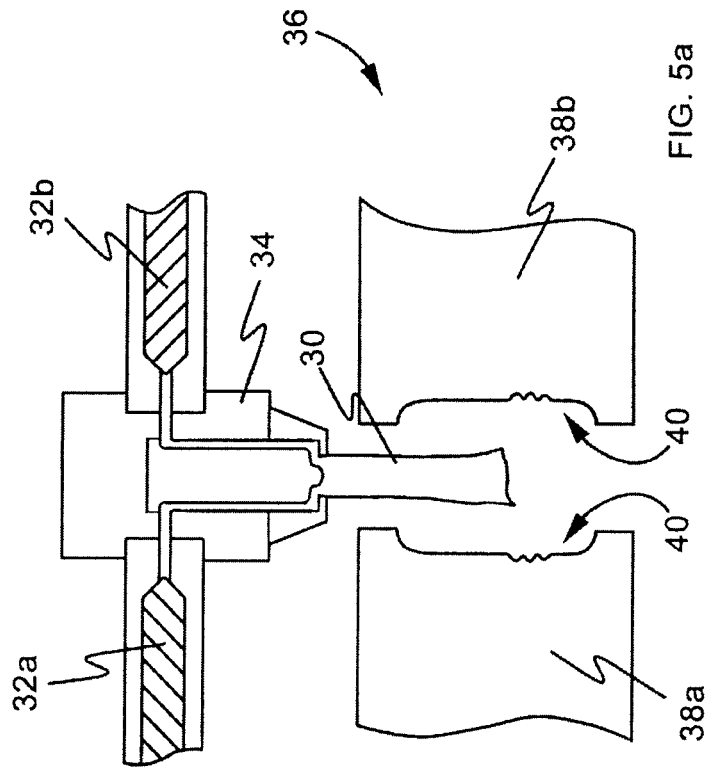
FIG. 5a
FIG. 5b

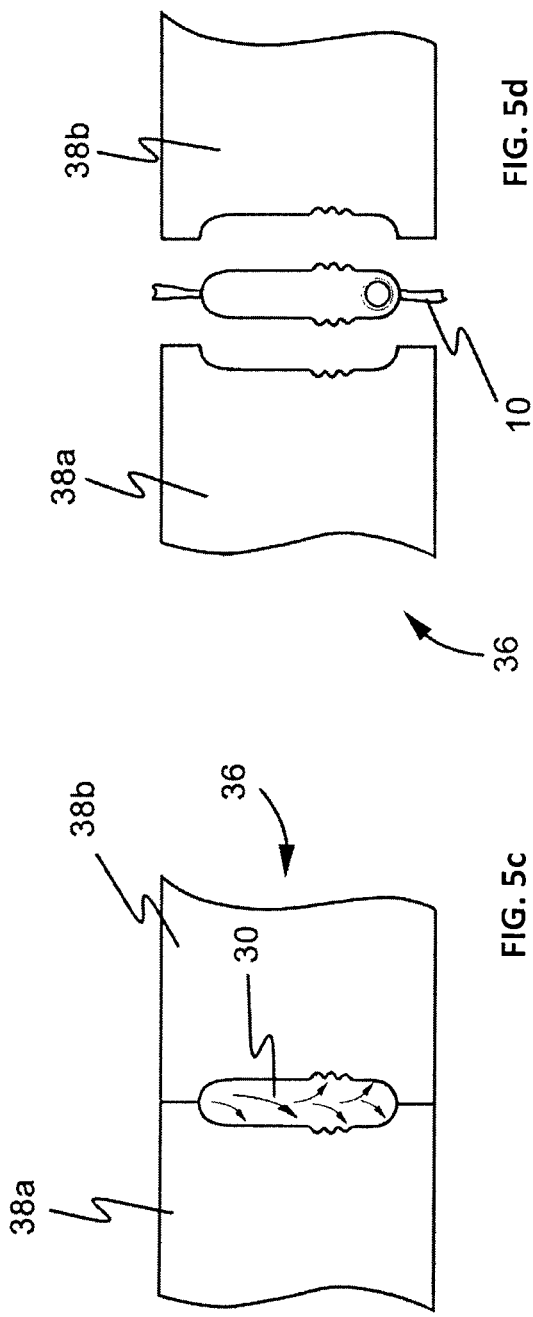

HOLLOW ARTICLE OF VARIABLE WALL STRUCTURE DENSITY

CROSS-REFERENCE TO RELATED APPLICATIONS

This application claims benefit under 35 U.S.C. 119(e) to U.S. Provisional Patent Application No. 61/419,142, filed Dec. 2, 2010, entitled "BLOW MOLDED ARTICLES AND METHODS OF THEIR PRODUCTION," which is incorporated by reference herein in its entirety.

FIELD OF THE INVENTION

The present disclosure relates to articles and processes for the production of hollow bodies from thermoplastic material and more particularly to hollow bodies comprising of a multi-layer structure with a foam layer and a skin layer of variable relative thickness.

BACKGROUND OF THE INVENTION

There is a need particularly in the automotive industry to manufacture parts in a cost effective manner that are generally light-weight in order to reduce fuel consumption in the operation of motor vehicles. One approach to achieve light-weighting is by foaming articles.

It is known that a foamed blow molded article can be manufactured by extruding a plastic containing a blowing agent to form a parison, inserting the foamed parison in a mold and then pressurizing the parison to form an article.

It is also known that a hollow structure can be made that is of multiple layers of substantially constant ratio that may include a foamed layer.

One limitation of the known processes is that the ratio of a foamed layer to its outer skin or to an extruded additional layer is substantially the same throughout the part. The foam layer introduces a structural deficiency at locations such as mounting tabs, at bellows or mounting cuffs in relation to similar entirely solid layered articles. There is a need for a cost effective method to introduce additional solid material at specific locations and to reduce the relative ratio of foamed material at these locations.

Another limitation of the known processes is that foamed plastic cannot be selectively located in areas where it is desired. There is a need to be able to add an increase in foamed material where improvements in acoustic or heat transfer properties are required.

There is a need for a cost effective method to introduce additional solid material at specific locations and to reduce the relative ratio of foamed material at these locations.

SUMMARY OF THE INVENTION

According to an aspect of an embodiment, provided is a molded thermoplastic article including a hollow body, the article comprising a first layer, and a foamed second layer, the first layer and foamed second layer defines a wall structure, the foamed second layer having a lighter density relative to the first layer. In the wall structure, the ratio of the first layer to foamed second layer varies along the length of the article.

According to another aspect of an embodiment, provided is a process for preparing a blow molded thermoplastic article, comprising extruding a parison comprising a first material and a second material, the first material presented generally in the form of a first layer, and the second material presented generally in the form of a second layer. The proportion of first and second materials relative to each other are varied along the length of the parison during extrusion. The parison is loaded into a blow molding mold, and air is injected into the parison to expand the parison to fill the mold and form a blow molded article, wherein the molded body has wall portions comprising the first and second material in varying proportion. On cooling the blow molded article, it is removed from the mold.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 is a longitudinal cross-sectional view of the duct of FIG. 1.

FIG. 5a is a schematic representation of an exemplary molding station for producing a hollow article in accordance with an embodiment of the invention.

FIG. 5b is an enlarged view of a parison formed in accordance with an embodiment of the invention.

FIG. 5c is a schematic representation of the molding station of FIG. 5a in the course of blow molding a hollow article.

FIG. 5d is a schematic representation of the molding station of FIG. 5a releasing a formed hollow article.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology with respect to automotive HVAC or air induction ducts, the invention may also be applied to hollow articles in general in both automotive and non-automotive applications. Furthermore, there is no intention to be bound by any expressed or implied theory presented in the preceding technical field, background, brief summary or the following detailed description.

Figure 1:
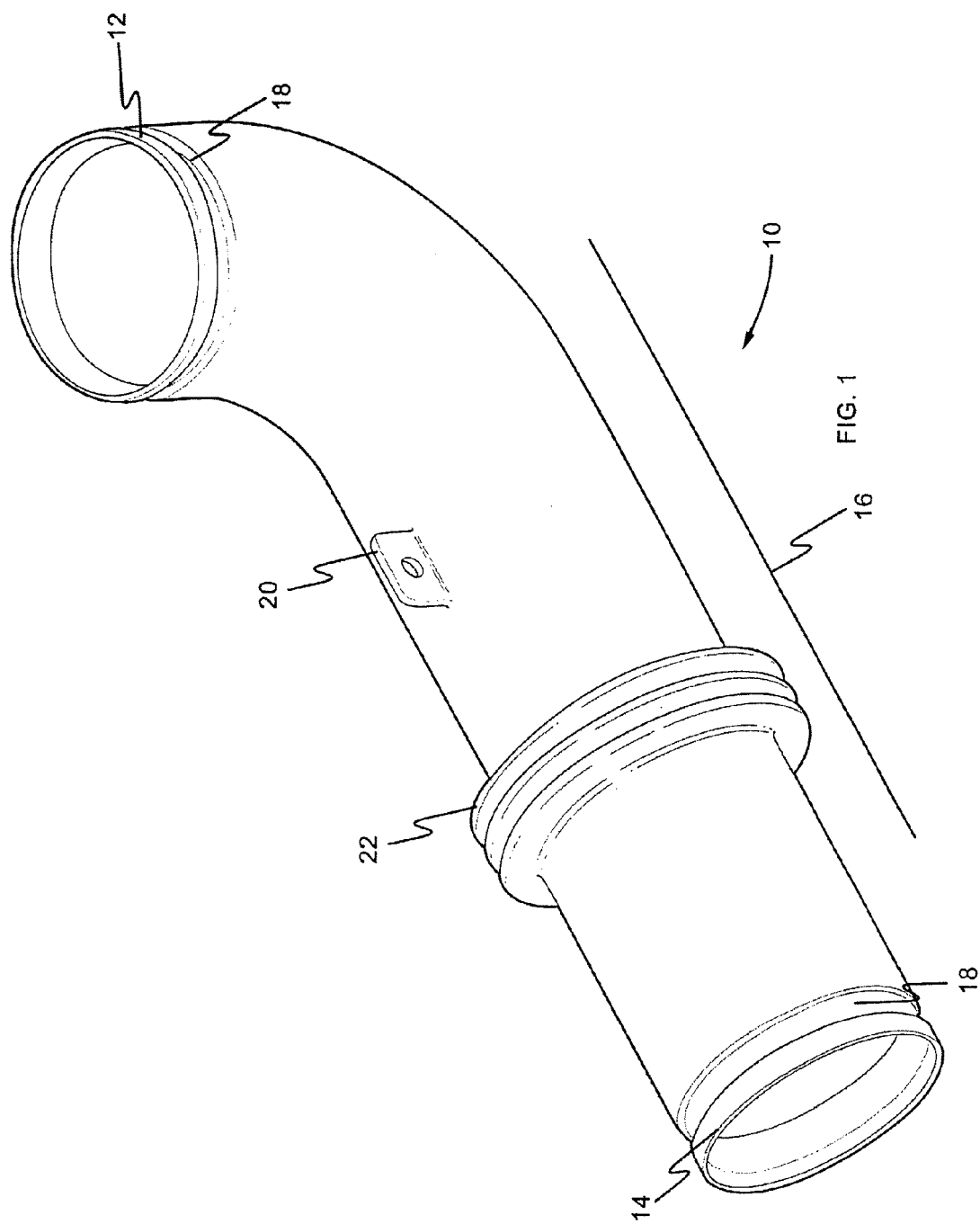
FIG. 1 is a perspective view of an exemplary duct manufactured in accordance with an embodiment of the invention.

Turning now to FIG. 1, shown is an exemplary HVAC or air induction duct 10 for a motor vehicle. In this configuration, duct 10 comprises first and second end sections 12, 14 and an intermediate section 16. At each end section 12, 14, there is provided an end cuff 18 for attachment of duct 10 to other air-delivery components in the automotive assembly. Within intermediate section 16, there may be additional features, such as mounting tab 20 for fastening duct 10 in position, and a bellows 22 to enable flex.

As detailed in the longitudinal section view of FIG. 2, duct 10 is generally comprised of a first layer 24 and a second layer 26. As presented, first layer 24 forms the outside layer, while second layer 26 forms the inside layer. First and second layers 24, 26 are formed of a thermoplastic material, and together define the wall structure of duct 10. One of first and second layers 24, 26 is further formulated or modified in a manner to achieve a reduced overall material density. For example, the thermoplastic material may be formulated as a foamed layer. For the purpose of explanation, the description herein will identify second layer 26 as the foamed layer, but it will be appreciated that in some embodiments, the foamed layer may be first layer 24. Foaming is generally achieved by using a chemical or physical blowing agent. Chemical blowing agents are mixed into plastic pellets in the form of powder or pellets and dissolve at higher temperatures. Above a certain temperature specific for blowing agent dissolution, a gaseous reaction product, usually $N_2$ or $CO_2$, is separated and acts as a blowing agent. Endothermic blow agents primarily produce $CO_2$, while exothermic blowing agents generally produce $N_2$. Physical blowing agents include hydrocarbons (e.g. isobutane, pentane), fluorocarbons (e.g. chlorofluorocarbons) and the inert gases (e.g. $CO_2$ and $N_2$).

Along the length of duct 10, that is from first end 12 to second end 14, and at intermediate points in-between, the amounts of first and second layers 24, 26 relative to each other, that is the ratio of first to second layers 24, 26 is varied, so as to achieve a selected localized physical/performance characteristic. By varying the ratio of first layer 24 to second layer 26, and where for example second layer 26 is provided as a foamed layer, it is possible to produce a range of localized densities along the length of duct 10. For example, by increasing the ratio of first layer 24 to foamed second layer 26, a localized increase in wall structure density can be achieved. Conversely, by decreasing the ratio of first layer 24 to foamed second layer 26, a localized decrease in wall structure density can be achieved.

The incorporation of a foamed second layer 26 in duct 10 can decrease the overall weight of the article, while also providing beneficial sound and thermal insulative effects. Regions with a decreased ratio of first layer 24 to foamed second layer 26, however, may be prone to breakage, particularly at locations where fasteners are used, or where increased durability in general is required. As such, the ratio of first layer 24 to foamed second layer 26 can be selectively varied along the longitudinal length of duct 10 to provide regions of increased density where additional strength is required, and regions of decreased density where light-weighting does not result in any structural disadvantage. For example, referring again to FIG. 2, at end cuffs 18 where the duct is attached to adjacent components, the ratio of first layer 24 to foamed second layer 26 is increased, to create a higher wall structure density. Similar increases in wall structure density are noted at mounting tab 20 and bellows 22. At locations where decreased wall structure density can be incorporated without risk of weakening/breakage of duct 10, for example at bend B, decreased ratios of first layer 24 to foamed second layer 26 may be used.

Figure 3A:
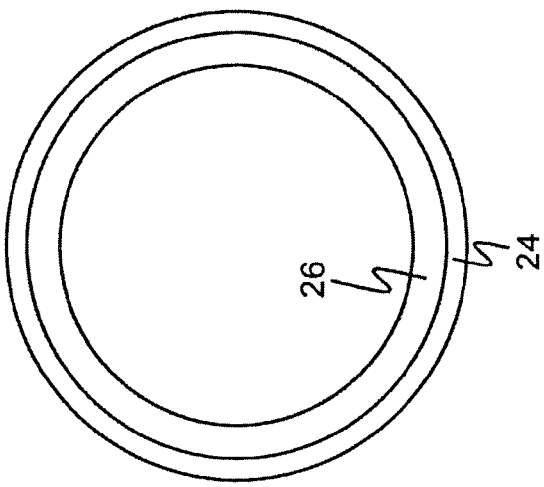
FIGS. 3a, 3b and 3c are cross-sectional views of the duct of FIG. 1 through A-A, B-B and C-C, respectively.
Figure 3B:
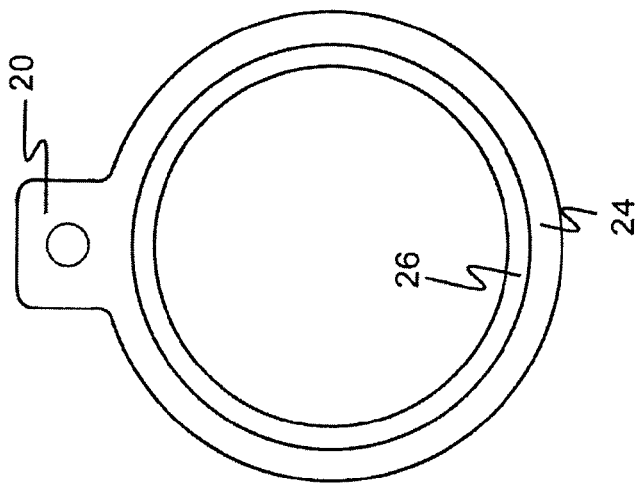
Figure 3C:
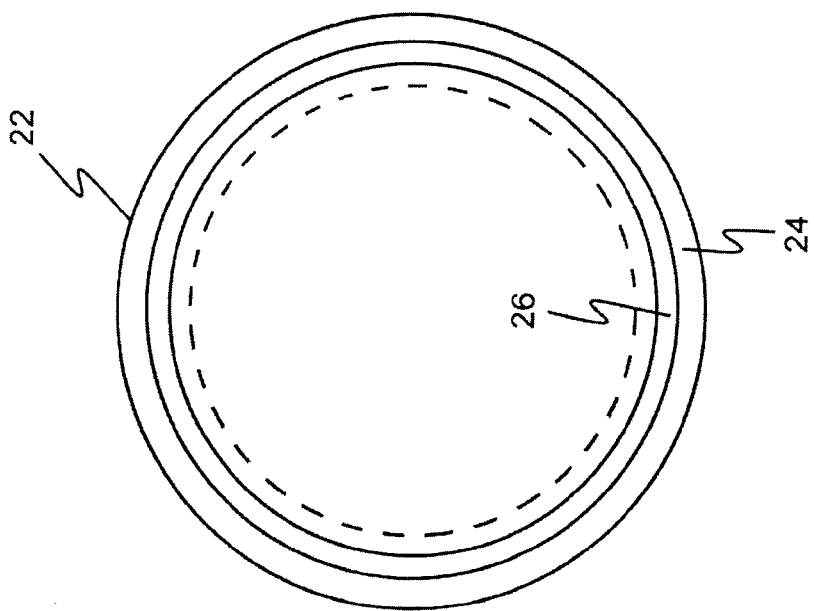

The variance in localized wall structure density is further illustrated in FIGS. 3a through 3c, wherein various cross-sections through duct 10 are provided. FIG. 3a details a section through an intermediate region (at A-A) where a decreased ratio of first layer 24 to foamed second layer 26 is used to lighten the overall structure. Since the primary function at this location of the duct is for channelling air-flow, a reduction in overall strength to achieve a lighter density, and generally to lighten the overall part, is operationally permissible. FIG. 3b details a section in the region of mounting tab 20 (at B-B), where an increased ratio of first layer 24 to foamed second layer 26 is used. As such, mounting tab 20 is provided with added strength and durability to cooperate with suitable fasteners to hold duct 10 in position. FIG. 3c details a section through bellows 22 (at C-C) and once again shows an increased ratio of first layer 24 to foamed second layer 26 for additional strength and durability.

Figure 4:
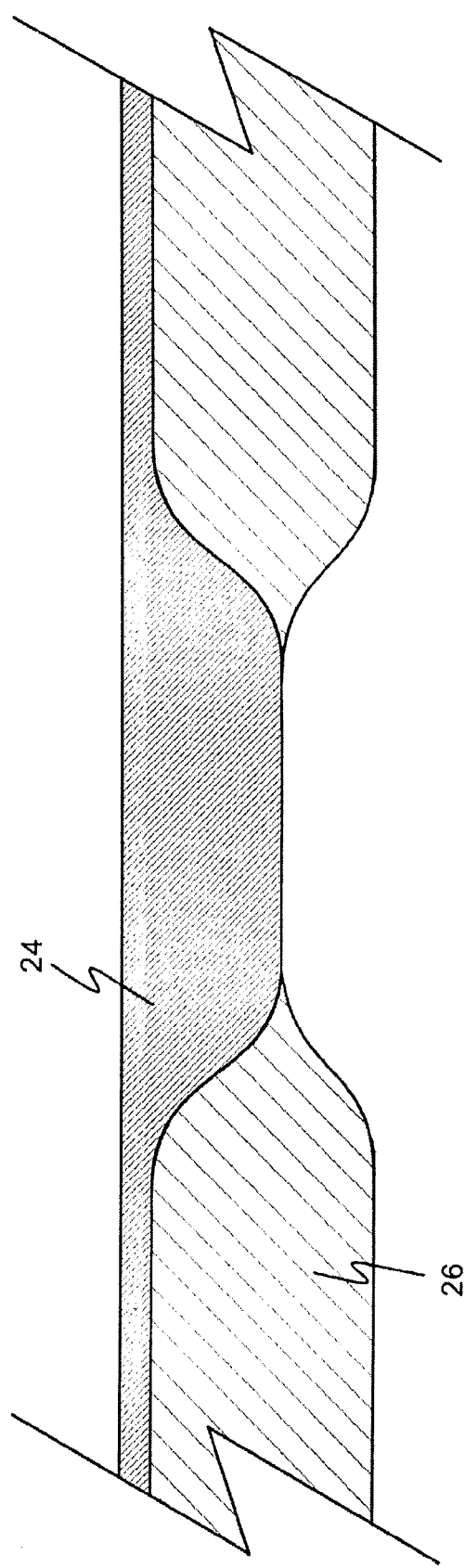
FIG. 4 is a partial cross-sectional view of a wall structure in which wall thickness additionally varies.

In some embodiments, the overall thickness of the 2-layer wall structure may also be varied. For example, referring now to FIG. 4, shown is a wall structure in which both the ratio of layers, as well as the quantitative measure (e.g. volume) of each of the layers is varied along the longitudinal length, resulting in a varied overall wall thickness. Toward each end of the section shown, the ratio of first layer 24 to foamed second layer 26 is low, as the wall structure presents a larger proportion of the foamed second layer 26. Towards the central region of the section, the ratio of first layer 24 to foamed second layer 26 is high, as the amount of foamed second layer 26 has been decreased, to provide a wall structure that is predominantly non-foamed first layer 24. In the central region, although the amount of first layer 24 provided is increased relative to the end regions, the overall wall thickness is less than that provided at the end regions. Stated differently, the cumulative quantitative measure of the first and second layers in the central region is less than the cumulative quantitative measure of the first and second layers at each end of the section shown.

Duct 10 may be formed through a blow molding process. As such, and as shown in FIG. 5a, the process begins with the manufacture of a parison 30 comprising a first material, corresponding to the first layer, and a second material, corresponding to the second layer. As shown, parison 30 is prepared using a multi-material co-extrusion process, where first and second materials are delivered via separate ram accumulators 32a/32b to a common die head 34. As the materials are co-extruded, and as detailed in FIG. 5b, first layer 24 and second layer 26 are formed in parison 30 simultaneously, with relative volumes defining the first to second layer ratio. As will be appreciated, other manufacturing processes may be implemented to achieve a hollow article having a varied ratio of first to second layers.

First and second layers 24, 26 are adjacently aligned, and integrally bonded together. During the extrusion process, the volume of each of first and second materials can be varied to achieve the desired ratio of first layer to second layer in the resulting parison 30. Based on the positioning of parison 30 in the mold for forming the hollow article, and the relative location of design features requiring added strength/durability, specific regions of parison 30 requiring selected ratios of first to second layers can be determined. For example, the regions R1 and R2 of parison 30 corresponding to the location of end cuffs 18 are provided with an increased ratrio of first layer 24 to foamed second layer 26, so as to increase the wall structure density, and hence the overall strength and durability within these regions. Similar increases in wall structure density are noted for regions R3 and R4 corresponding to mounting tab 20 and bellows 22, respectively. In some embodiments, parison 30 may be further modified with varying overall wall thickness so as to address the stretch ratios subjected upon parison 30 during the blow mold process. For example, where parison 30 is subjected to an increased stretch ratio at a particular region, that region can be provided with an increased overall wall thickness such that in the final product, the wall thickness along the product is generally constant.

Parison 30 with varying ratios of first layer 24 to foamed second layer 26 is then positioned or transferred to a blow mold 36 having a cavity configuration suited to producing the desired hollow article, such as the automotive duct exemplified here. In the embodiment shown, blow mold 36 comprises two mold halves 38a/38b that together define a mold cavity 40 having the desired end product profile. Where parison 30 is transferred from an extruding station to a blow mold station, a suitable conveying device [not shown] may be used. With parison 30 positioned within blow mold 36, mold halves 38a/38b can be closed as shown in FIG. 5c, and a blow molding pressure can be applied through one or more blow needles/pins (not shown). As such, parison 30 is caused to bear completely against the contour of mold cavity 40, thus forming the final hollow article. On completion of the blow molding step and cooling period, blow mold 36 is opened, and the resulting hollow article (e.g. duct 10) is removed, as shown in FIG. 5d, and subjected to post-mold processing, if necessary, to remove flashing or other waste material. In some embodiments, a flashless blow molding process may be used in which the resulting hollow article is formed in substantially final form, requiring minimal, if any, post-mold processing.

Figure 6A:
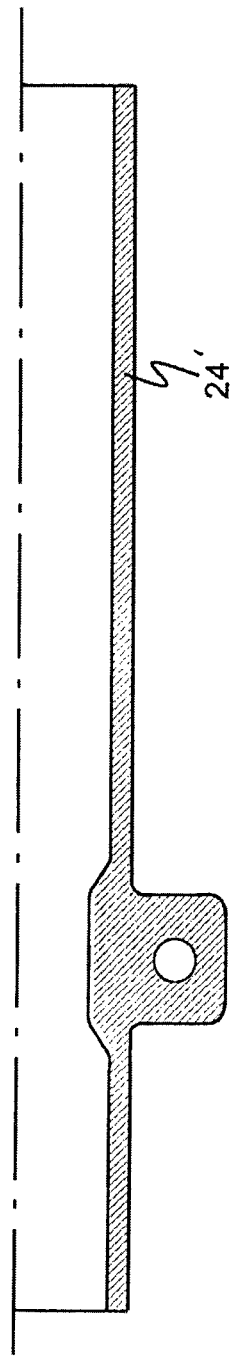
FIGS. 6a and 6b are partial cross-sectional views showing an alternate molding process for forming a hollow article using overmolding.
Figure 6B:
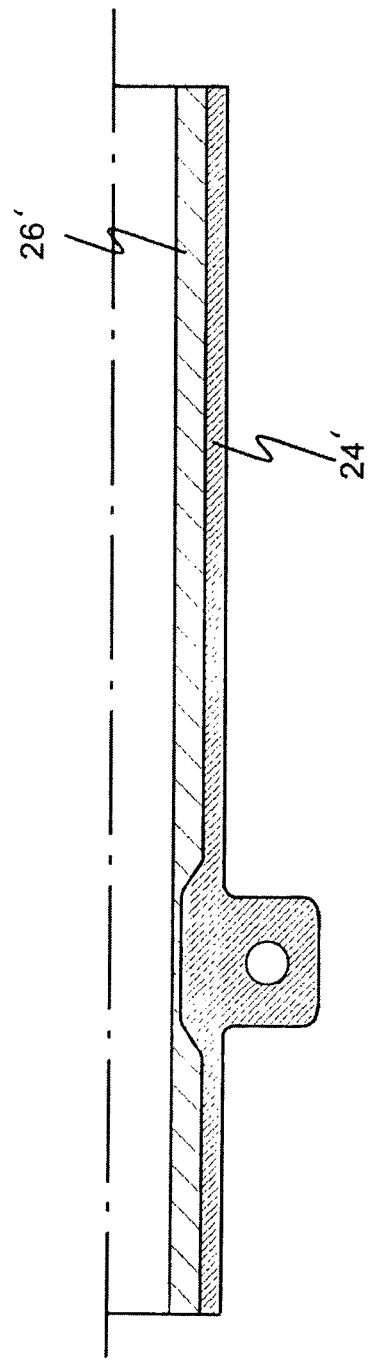

In some embodiments, the hollow article, that is duct 10 as exemplified here may be formed through injection molding. An injection molded duct may be formed in multiple component parts that in post-mold processing are bonded together to form the final part. In forming the component parts, a multi-layer construction having the varied ratio of first to second layers may be achieved by performing a series of injection molding steps, in which first layer 24' is first injection molded, to achieve the wall structure profile shown in FIG. 6a, and wherein second layer 26' is subsequently overmolded on first layer 24', to achieve the wall structure profile shown in FIG. 6b. Manufactured this way, injection of non-foamed first layer 24' in the first molding step permits for the establishment of the strengthened regions where the ratio of first layer 24' to foamed second layer 26' is increased. Where the ratio of first layer 24' to foamed second layer 26' is decreased, that is where light-weighting of the article is structurally permissible, second layer 26' is selectively applied in the overmolding step to achieve the desired final thickness. It will be appreciated that while first layer 24' is shown as generally continuous along the length of the article, first layer 24' may be applied at discrete points within the article to form separated structural features, which can be later overmolded with second layer 26' to form a fully integrated final article.

A wide range of ratios of first layer to foamed second layer may be implemented in the construction of a hollow article. While dependent upon the manufacturing technology, the full range of possible first to second layer ratios of include 0:100 (where no first layer is present) to 100:0 (where no foamed second layer is present). For example, where co-extrusion is used, the volume of either of first and second layer 24, 26 may be reduced to zero, so as to achieve the upper and lower ratios detailed above. Where the injection molding process is used, the overmolding step may require a minimum amount of second material to be injected, thus resulting in at least a thin second layer throughout the article. In a specific example of duct 10, in regions where added strength and durability are required, a ratio of first layer to foamed second layer may be 80:20. In regions where density can be reduced without causing a structural deficiency, a ratio of first layer to foamed second layer may be 20:80. It will be appreciated that this range of ratios is merely exemplary, and that the range of ratios possible in a given implementation will depend on the desired performance characteristics and the structural specifics of the particular component in question.

In some embodiments, additional layers of material may be incorporated in the wall structure. For example, where the materials forming the first and second layers are incompatible, a third layer may be incorporated between the first and second layers to facilitate bonding. As such, the third layer may function as an adhesive layer. A third layer may also be incorporated to provide additional barrier, and/or structural characteristics. While additional layers may be incorporated between the first and second layers they may also be positioned to either side of the first and second layers.

While the technology has been exemplified with respect to an automotive duct, the technology may find application in a range of other automotive and non-automotive hollow articles. While an increased ratio of first layer to foamed second layer was described for regions comprising structural features such as mounting tabs, bellows and end cuffs, the localized increase in density may be implemented for a range of other structural features. For example, an increased ratio of first layer to foamed second layer may be implemented in regions of an article having stiffening structures such as ribs, or at weld points in injection molded articles.

While the embodiments detailed herein have identified the second layer as the foamed layer, in some embodiments, the first layer may be configured as the foamed layer. As such, in embodiments where the second layer is foamed, the foam layer is generally towards the interior of the hollow article. Alternatively, in embodiments where the first layer is the foamed layer, the foam layer is generally towards the exterior of the hollow article.

A range of suitable thermoplastic materials may be used to form duct 10, and hollow articles in general having the 2-layered structure detailed above. Exemplary materials include, but are not limited to polypropylene, polyethylene, nylon, polyphenylene ether (PPE), polyphenylene sulfide (PPS), and combinations thereof. When used in the foamed layer, formulations comprised of these materials additionally comprise a physical or chemical blowing agent. While the first and second materials may be the same thermoplastic, with one comprising the foaming agent, in some embodiments, the first and second materials may be different thermoplastics, or thermoplastic compositions comprising different durometers.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A molded thermoplastic article including a hollow body, the article comprising:
   a first layer;
   a foamed second layer;
   wherein the article comprises a wall structure incorporating said first layer and said foamed second layer, said foamed second layer having a lighter density relative to said first layer, and wherein a ratio of a thickness of said first layer to a thickness of said foamed second layer varies along the length of said article, and wherein along the length of the article, the quantitative measure of said first layer and said foamed second layer provides the wall structure with a generally constant thickness along the length of the article.

2. The molded thermoplastic article according to claim 1, wherein said foamed second layer is foamed using a chemical or physical blowing agent.

3. The molded thermoplastic article according to claim 1, wherein said ratio is increased at regions of the article requiring increased wall structural density.

4. The molded thermoplastic article according to claim 1, wherein said ratio is decreased at regions of the article requiring decreased wall structural density.

5. The molded thermoplastic article according to claim 1, wherein said first layer is an outside layer, and said foamed second layer is an inside layer.

6. The molded thermoplastic article according to claim 1, wherein said first layer is an inside layer, and said foamed second layer is an outside layer.

7. The molded thermoplastic article according to claim 1, wherein the article is an automotive HVAC or air induction duct.

8. The molded thermoplastic article according to claim 7, wherein said duct has an increased ratio of said first layer to said foamed second layer in regions of said duct requiring increased wall structure density.

9. The molded thermoplastic article according to claim 8, wherein said regions requiring increased wall structure density include at least one of end cuffs, mounting tabs, and bellows.

* * * * *